J. S. BRENNAN AND R. E. NICHOLUS.
IGNITER TORCH.
APPLICATION FILED AUG. 20, 1918.
1,321,280.
Patented Nov. 11, 1919.
2 SHEETS—SHEET 2.
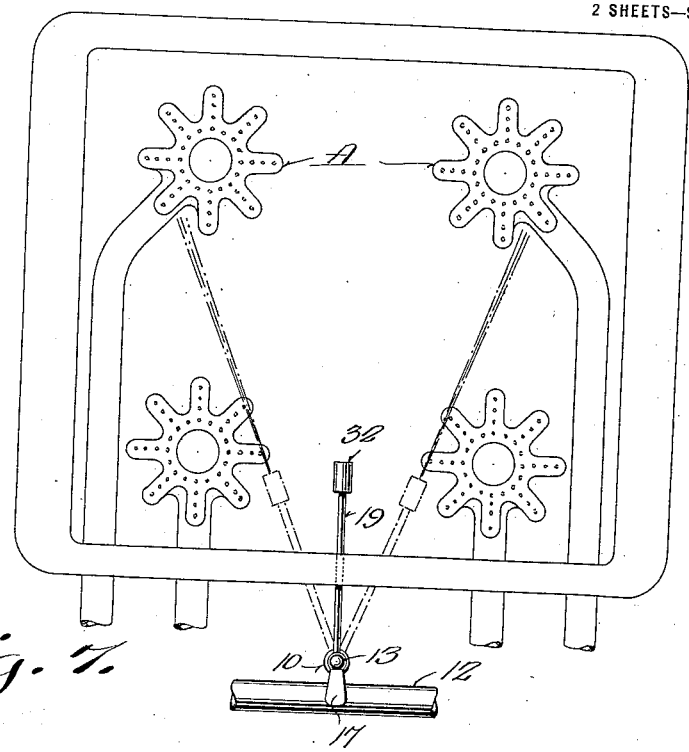
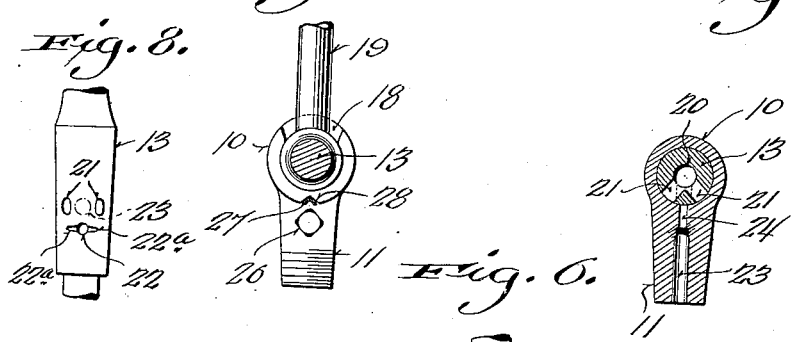
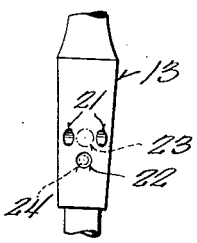
WITNESS
INVENTOR
John S. Brennan
Robert E. Nicholus
BY
ATTORNEY

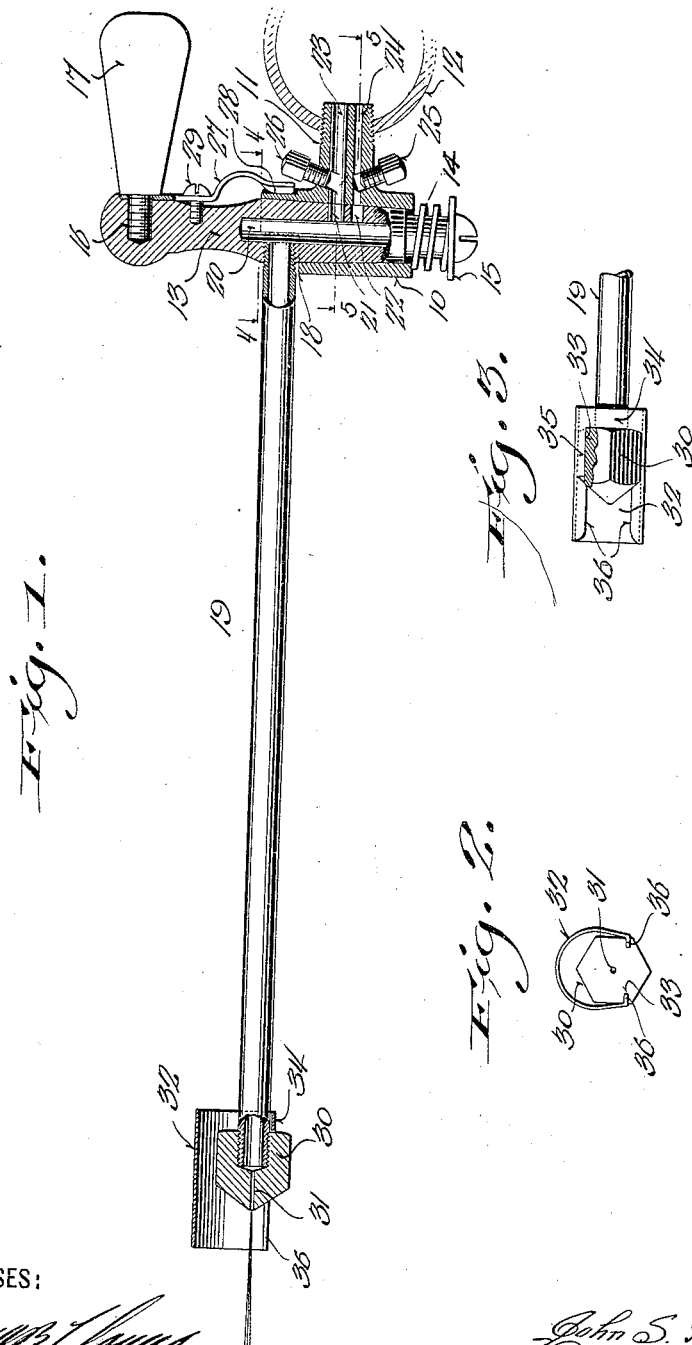

UNITED STATES PATENT OFFICE.

JOHN S. BRENNAN AND ROBERT E. NICHOLUS, OF MILWAUKEE, WISCONSIN, ASSIGNORS TO A. J. LINDEMANN & HOVERSON COMPANY, OF MILWAUKEE, WISCONSIN.

IGNITER-TORCH.

1,321,280.  Specification of Letters Patent.  Patented Nov. 11, 1919.

Application filed August 20, 1918. Serial No. 250,686.

*To all whom it may concern:*

Be it known that we, JOHN S. BRENNAN and ROBERT E. NICHOLUS, both citizens of the United States, and residents of Milwaukee, in the county of Milwaukee and State of Wisconsin, have invented certain new and useful Improvements in Igniter-Torches; and we do hereby declare that the following is a full, clear, and exact description thereof.

Our invention relates to new and useful improvements in gas stove igniter torches, more particularly of that type wherein the torch member is movable selectively toward any one of a plurality of burners to be ignited by the projection of a torch jet therefrom, a pilot light being constantly maintained to provide ignition of the jet whenever the device is operated.

It is primarily the object of our invention to provide an arrangement wherein movement of the torch to an igniting position from a neutral or central position serves to simultaneously effect an igniting flow of gas through the torch whereby to eliminate the necessity of a second movement of any part of the device independently of the simple turning movement for procuring the igniting flow.

A further object is to simplify the general structure of devices of this character and such simplification is compassed to a large extent in the accomplishment of our first recited object, by eliminating the necessity for providing independently movable mechanism to procure flow of gas through the torch.

A still further object resides in the provision of means for preventing accidental actuation of the torch member, and to insure its retention in a neutral position when not in use.

A still further object resides in the provision of an exceedingly simple hood member for the torch head, which is light and which may be readily manipulated for cleaning the torch head.

With the above and other objects and advantages in view, which will be apparent as the description proceeds, our invention resides in the novel features of construction, combination and arrangement of parts hereinafter described and pointed out in the appended claims.

In the accompanying drawings:

Figure 1 is a vertical longitudinal sectional view through an igniter torch constructed in accordance with our invention, the major portion of the torch tube being shown in elevation.

Fig. 2 is an end view of the torch head.

Fig. 3 is a bottom plan view of the torch head, a portion thereof being broken away.

Fig. 4 is a horizontal sectional view on the line 4—4 of Fig. 1.

Fig. 5 is a similar sectional view on the broken line 5—5 of Fig. 1.

Fig. 6 is an elevational view of the valve head.

Fig. 7 is a plan view, in conventional outline, of a gas stove, showing the application of our improved igniter torch thereto.

Fig. 8 is a detail elevation of the valve head showing a modified form of pilot light port.

Referring now more particularly to the accompanying drawings, our improved torch device includes a valve casing 10, of the general type employed in gas stove connections, having a nipple 11 projecting from its intermediate portion for threading engagement in the main supply pipe 12 of a gas stove. Rotatably mounted in the casing is a valve member 13, projecting from both ends thereof and having its portion disposed in the casing slightly tapered and urged downwardly into snug fit in the casing by the usual expansile spring 14 on its reduced lower end bearing against the bottom of the casing and against the washer 15 on said reduced end. The valve head is extended above the casing and enlarged for the reception of a threaded shank 16 of a handle 17. The upper portion of the casing is provided with a recess 18 extending transversely in its side remote from the nipple 11, and threaded in the valve head is one end of a torch tube 19, which is slidable in the recess, rotative movement of the valve and of the torch being limited by abutment of the tube with the ends of the recess. The valve head is provided with a longitudinal passage 20 therethrough, which communicates with the tube 19, and adjacent the nipple 11 of the casing the valve head is provided with a pair of horizontally spaced transverse ports 21, and with a port 22 disposed under the ports 21 and midway between planes passing through the axes of said ports 21. A main inlet port 23 extends through the nipple and is adapted to selectively connect the ports 21 with the supply pipe 12, and disposed in the nipple under this port 23 is a second port 24 adapted to connect the port 22 with the supply pipe 12. The ports 22 and 24 are for the purpose of permitting sufficient flow of gas to maintain a pilot light at the torch head, this flow of gas being controlled, when the ports are in registry, by a screw 25 threaded in the nipple and adapted to project into the port 24. The port 23 and either of the ports 21 are adapted to permit a sufficient flow of gas through the torch tube to provide an igniting jet, and while I have shown a valve screw 26 threaded in the nipple and adapted to project across the port 23, this valve screw is used only under conditions of exceedingly high pressures, such as is encountered with natural gas, the sizes of the ports serving, under neutral conditions, to control the flow.

When the torch tube 19 projects at right angles from the supply pipe 12, in what will be hereinafter termed neutral position, the port 23 is disposed midway between and out of communication with either of the ports 21, while the port 24 is disposed in registry with the port 22, and thus only a sufficient flow of gas is permitted to pass through the valve and the torch tube, to maintain a pilot light at the torch head, it being particularly noted that the horizontal dimensions of the port 22 are such that it will not move out of registry with its port 24 prior to engagement of the port 23 with either of the ports 21, whereby at all times a sufficient flow of gas is provided through the device to maintain a light at the torch head.

For yieldably holding the valve and torch tube in neutral position and for moving them to neutral position when immediately thereadjacent, a spring plate 27 has its upper end secured to the valve head preferably by engagement on the shank 16 of the handle 17, and has its lower portion bowed outwardly, with its extremity transversely curved and engageable in a recess 28 formed in the upper portion of the valve casing opposite its recess 18. Tension of this spring strip or pawl is adjusted by means of a screw 29 passed through its intermediate portion and threaded in the upper portion of the valve head.

The torch head comprises a cap member 30 threaded on the free end portion of the torch tube and provided with a jet passage 31 extending therethrough to the apex of its frustoconical end portion, the sides of the cap comprising regular flat faces. To provide an exceedingly simple, light and readily removable hood for the torch head, a sheet of metal, 32, equal in length to approximately twice the length of the torch head is bent in inverted channel shape and its side edge portions are directed inwardly forming flanges which are slidably engageable in longitudinal grooves 33, these flanges being connected at one end by a strap portion 34 extending transversely therebetween. The flange portions 35 adjacent the strap 34 are of less width than the other flange portions 36. As shown, the hood is normally positioned on the burner head with the strap 34 abutting the rear thereof, and to detach the hood from the burner head, it is slid rearwardly thereof, the strap 34 serving to retain the hood on the torch tube 19, so that it will not become lost. By the relative greater width of the flange portions 36, the sides of the hood are spread upon passage of such portions through the torch head grooves 33 and thus such widened flange portions serve to positively hold the hood with its narrower flange portions 35 engaged in the grooves thereof.

The operation of our improved device is exceedingly simple. In Fig. 7, A designates each of a plurality of burners of a gas stove, and our device is attached to the supply pipe 12 in such manner, that in neutral position the torch is directed midway between the burners. Upon grasping the handle 17 and turning it in either direction, the torch will be swung in an opposite direction toward the desired burner, to simultaneously procure the igniting flow of gas, and direct the resultant jet in igniting relation to the burner. While I have shown the torch tube movable in only two igniting positions from neutral, it will be appreciated that any number of igniting positions may be provided therefor, contingent upon the provision of a corresponding set of ports 21 in the valve head.

It will also be understood that various changes and modifications of structure may be employed to meet differing conditions of use without departing in any manner from the spirit of the invention as interpreted by the accompanying claims.

As shown in the modified structure of Fig. 8, the pilot light port may be provided with lateral groove extensions 22ª extending transversely from said port in the periphery of the valve head, to thus insure an adequate pilot light supply of gas when the valve is turned from complete registry of the port 22 with its valve casing port 24 to procure registry of either of the main valve head ports 21 with the main supply port 23. It will however, be appreciated that any arrangement of ports procuring a continuous pilot supply flow of gas when the main supply ports 24 are out of registry may be provided.

What is claimed is:

1. An igniter torch comprising a substantially cylindrical valve casing having a lateral nipple adapted for engagement in a gas supply pipe, said nipple being provided with a pair of ports extending therethrough and having differential capacity, a portion of the casing remote from said nipple being cutaway to provide a pair of stop shoulders, a valve member rotatable in the casing, a lateral handle on the upper end of the valve member, a torch tube extending from the valve member through the cutaway portion of the valve casing and adapted for abutment with said shoulders to limit rotative movement of the valve member, and ports in the valve member communicating with the supply tube and adapted for communication with the ports of the casing nipple, one set of said ports constituting a pilot supply and being in registry when the other ports are out of registry.

2. An igniter torch comprising a valve casing having an inlet port, a valve member rotatable in the casing, a torch tube carried by the valve member, a port in the valve member communicating with the torch tube and movable into and out of registry with the inlet port of the casing upon and by rotative movement of the valve member and torch tube, and means for holding the valve member in neutral position.

3. An igniter torch comprising a valve casing having an inlet port, a valve member rotatable in the casing, a torch tube carried by the valve member, a port in the valve member communicating with the torch tube and movable into and out of registry with the inlet port of the casing upon and by rotative movement of the valve member and torch tube, and means for resiliently urging the valve member and torch tube to neutral position.

4. An igniter torch comprising a valve casing having an inlet port, a valve member rotatable in the casing, a torch tube carried by the valve member and a port in the valve member communicating with the torch tube and movable into and out of registry with the inlet port of the casing upon and by rotative movement of the valve member and torch tube, the valve casing being provided with a recess, and a spring arm carried by the valve member and engageable in the recess to urge the valve member to neutral position, and to hold it in such position.

5. An igniter torch comprising a valve casing, a nipple extending from said casing for engagement in a supply pipe, a main port extending through the nipple, a second port extending through the nipple and disposed under the first port, a valve member rotatable in the casing, a torch tube carried by the valve member, a main port in the valve member communicating with the torch tube and adapted to move into and out of registry with the said main inlet port upon rotation of the valve member and torch, and a second port in the valve member adapted to register with the said second inlet port when the main ports are out of registry to provide a pilot light flow of gas for the torch.

6. In an igniting torch of the class described, a torch head including a body member provided with grooves in its sides and a shield for said body member comprising a plate bent in channel shape, with its side edges directed inwardly and forming flanges slidably engageable in the grooves.

7. In an igniting torch of the class described, a torch head including a body member provided with grooves in its sides, a shield for said body member comprising a plate bent in channel shape, with its side edges directed inwardly and forming flanges slidably engageable in the groove, and a strap member connecting adjacent corner portions of the plate and abutting the body member to limit sliding movement of the shield plate.

8. In an igniting torch of the class described, a torch head including a body member provided with grooves in its sides, a shield for said body member comprising a plate bent in channel shape, with its side edges directed inwardly and forming flanges slidably engageable in the grooves, and a strap member connecting adjacent corner portions of the plate and abutting the body member to limit sliding movement of the shield plate, the flange portions remote from said strap member being relatively wider than the flange portions there-adjacent, whereby to form stops yieldably preventing sliding movement of the shield plate.

In testimony that we claim the foregoing we have hereunto set our hands at Milwaukee, in the county of Milwaukee and State of Wisconsin.

JOHN S. BRENNAN.
ROBERT E. NICHOLUS.

Copies of this patent may be obtained for five cents each, by addressing the "Commissioner of Patents, Washington, D. C."